United States Patent
Liu et al.

(10) Patent No.: US 10,254,880 B2
(45) Date of Patent: Apr. 9, 2019

(54) TOUCH PROJECTION SCREEN AND PROJECTION SYSTEM

(71) Applicant: Coretronic Corporation, Hsin-Chu (TW)

(72) Inventors: Chen-Kun Liu, Hsin-Chu (TW); Nan-Jiun Yin, Hsin-Chu (TW); Pen-Ning Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 129 days.

(21) Appl. No.: 15/173,724

(22) Filed: Jun. 6, 2016

(65) Prior Publication Data

US 2017/0068379 A1 Mar. 9, 2017

(30) Foreign Application Priority Data

Sep. 4, 2015 (TW) .............................. 104129276 A (51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04102* (2013.01); *G06F 2203/04112* (2013.01)

(58) Field of Classification Search
CPC .................. G06F 3/044; G06F 3/0416; G06F 2203/04102; G06F 2203/04112
See application file for complete search history.

(56) References Cited

U.S. PATENT DOCUMENTS

2006/0101682 A1* 5/2006 Shi .................... G06F 3/046
40/446
2008/0180584 A1 7/2008 Utsunomiya et al.
(Continued)

FOREIGN PATENT DOCUMENTS

CN 1414515 4/2003
CN 102725719 10/2012
(Continued)

OTHER PUBLICATIONS

"Office Action of Taiwan Counterpart Application", dated Apr. 21, 2016, p. 1-p. 3.
(Continued)

*Primary Examiner* — Lixi C Simpson
(74) *Attorney, Agent, or Firm* — JCIPRNET (57) ABSTRACT

A touch projection screen including a substrate, touch layers, and a reflective projection film is provided. The touch layers and the reflective projection film are sequentially disposed on the substrate, and the touch layers are located between the substrate and the reflective projection film. Each of the touch layers comprises a base layer and an electrode pattern disposed on the base layer. Each electrode pattern includes a plurality of electrode line sets. Each electrode line set includes a plurality of electrode lines and a plurality of electrode segments. The electrode lines are arranged to be parallel to each other. An included angle between each of the electrode segments and one of the electrode lines is an acute angle. Two ends of each electrode segment are connected to the corresponding electrode lines. In addition, a touch projection system including the touch projection screen and a projection device is provided.

12 Claims, 5 Drawing Sheets

(56) References Cited

U.S. PATENT DOCUMENTS

| | | | | |
|---|---|---|---|---|
| 2010/0283752 A1* | 11/2010 | Maeda | ............... | G06F 3/0416 345/173 |
| 2012/0312677 A1* | 12/2012 | Kuriki | ............... | G06F 3/044 200/600 |
| 2015/0002464 A1* | 1/2015 | Nishioka | ............... | G06F 3/044 345/174 |
| 2015/0227242 A1 | 8/2015 | Cok | | |

FOREIGN PATENT DOCUMENTS

| | | |
|---|---|---|
| CN | 103383617 | 11/2013 |
| CN | 103105970 | 9/2014 |
| CN | 104657002 | 5/2015 |
| JP | 2004063905 | 2/2004 |
| TW | I444862 | 7/2014 |
| TW | M482790 | 7/2014 |

OTHER PUBLICATIONS

Office Action of China Counterpart Application, dated Sep. 28, 2018, pp. 1-10.

* cited by examiner

TOUCH PROJECTION SCREEN AND PROJECTION SYSTEM

CROSS-REFERENCE TO RELATED APPLICATION

This application claims the priority benefit of Taiwan application serial no. 104129276, filed on Sep. 4, 2015. The entirety of the above-mentioned patent application is hereby incorporated by reference herein and made a part of this specification.

BACKGROUND OF THE INVENTION

Field of the Invention

The invention relates to a projection screen, and particularly relates to a touch projection screen and a projection system including a projection device and the touch projection screen.

Description of Related Art

As electronic devices are developed to become multi-functional, the conventional click-button operational interface is no longer able to meet the user's needs. Under such circumstance, the development of the touch technology becomes more and more prosperous. Compared with the conventional click-button operational interface, inputting using a touch operational interface is more convenient and intuitive. The user may input by touching on a display surface of an electronic device by using a finger or a touch pen. In addition to the display surface of an electronic device, the touch technology may also be used in a projection screen for a projection device to project an image, so that the user may also input by touching the projection screen.

Currently, the capacitive touch technology is the main stream for the touch operational interface. The touch layer thereof is normally formed of a substrate and an indium tin oxide (ITO) electrode on the substrate. Due to limitations on the manufacturing technology, the touch layer including the ITO electrode is not applicable to a touch interface in a larger size. In addition, the touch layer used in the display surface of an electronic device requires a high light transmittance to prevent a negative influence on the display quality of the electronic device. Such requirement also increases the manufacturing complexity of the touch layer. Besides, to increase a touch area of the touch layer, electrode lines of the electrode in some designs are expanded by being formed with a plurality of rhombic electrodes connected to each other. However, such designs significantly increase the time required for an etching process of the electrode and make the manufacturing cost higher. Furthermore, the conventional touch operational interface is formed by one touch layer and is unable to flexibly cope with the practical needs by disposing a plurality of touch layers with respect to each other.

The information disclosed in this "BACKGROUND" section only serves to enhance understanding of the background of the invention and therefore it may contain information that does not form the prior art that is already known to a person of ordinary skill in the art. Furthermore, the information disclosed in this "BACKGROUND" section does not mean that one or more problems to be solved by one or more embodiments of the invention were acknowledged by a person of ordinary skill in the art.

SUMMARY OF THE INVENTION

The invention provides a touch projection screen applicable to a large-size touch interface and capable of reducing a manufacturing complexity and a manufacturing cost.

The invention provides a projection system. A touch projection screen of the projection system is applicable to a large-size touch interface and capable of reducing a manufacturing complexity and a manufacturing cost.

Other objects and advantages of the invention can be further illustrated by the technical features broadly embodied and described as follows.

In order to achieve one or a portion of or all of the objects or other objects, an embodiment of the invention provides a touch projection screen. The touch projection screen includes a substrate, a first touch layer, a second touch layer, and a reflective projection film. The first touch layer is disposed on the first substrate. The first touch layer includes a first base layer and a first electrode pattern. The first electrode pattern is disposed on the first base layer. Each first electrode pattern includes a plurality of first electrode line sets. Each first electrode line set includes a plurality of first electrode lines and a plurality of first electrode segments. The first electrode lines are arranged to be parallel to each other. An included angle between each of the first electrode segments and one of the first electrode lines is an acute angle. Two ends of each first electrode segment are connected to the corresponding first electrode lines. The second touch layer is disposed on the first touch layer. The second touch layer includes a second base layer and a second electrode pattern. The second electrode pattern is disposed on the second base layer. Each second electrode pattern includes a plurality of second electrode line sets. Each second electrode line set includes a plurality of second electrode lines and a plurality of second electrode segments. The second electrode lines are arranged to be parallel to each other. An included angle between each of the second electrode segments and one of the second electrode lines is an acute angle. Two ends of each second electrode segment are connected to the corresponding first electrode lines. The reflective projection film is disposed on the second touch layer.

In order to achieve one or a portion of or all of the objects or other objects, an embodiment of the invention provides a projection system. The projection system includes the touch projection screen and a projection device. The projection device projects an image light beam on the touch projection screen.

Based on above, the embodiments of the invention at least exhibit one of the following advantages or effects. The plurality of electrode lines of the same electrode line set is connected by using the plurality of electrode segments. When any of the electrode lines is disconnected, the signal (electric current) in the normal and not disconnected electrode lines is directed to the disconnected electrode lines, so as to ensured that other sections of the disconnected electrode line are still able to function normally.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
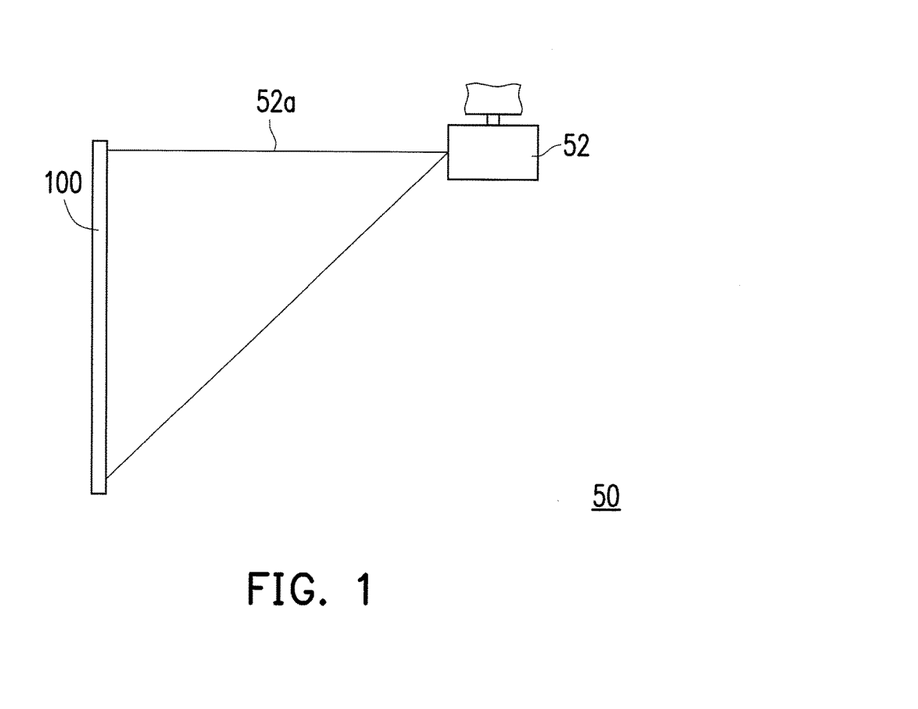
FIG. 1 is a schematic view illustrating a projection system according to an embodiment of the invention.

Referring to FIG. 1, in this embodiment, a projection system 50 includes a touch projection screen 100 and a projection device 52. The touch projection screen 100 is a capacitive touch projection screen, for example. The projection device 52 may project an image light beam 52a onto the touch projection screen 100, so that the image light beam 52a is provided for the user's viewing by reflecting the image light beam 52a. The touch projection screen 100 is electrically connected to a host (not shown), for example. The user may perform a touch operation on the touch projection screen 100, so as to control contents of an image output by the host.

Figure 2:
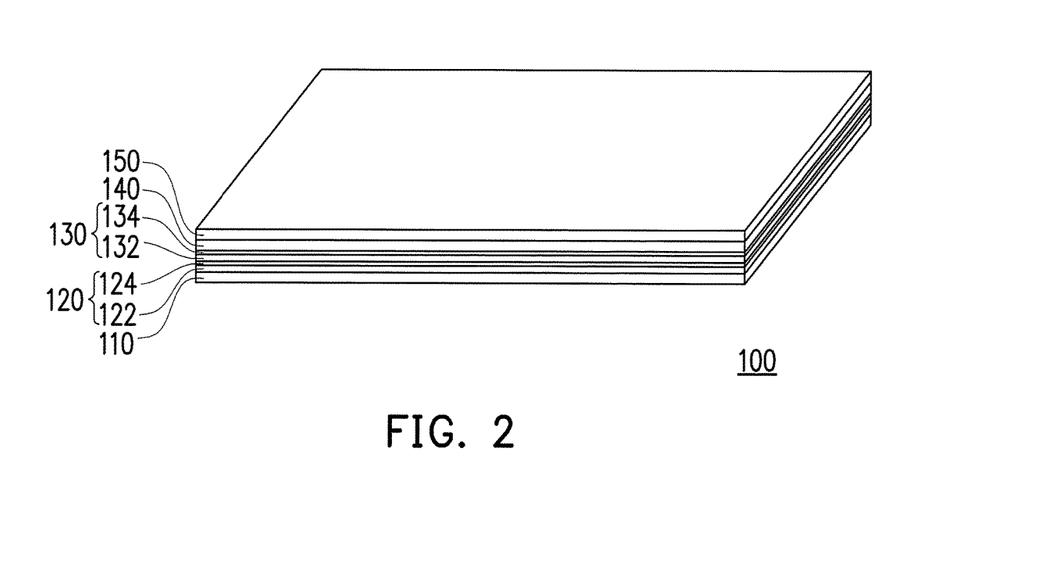
FIG. 2 is a perspective view of the touch projection screen of FIG. 1.
Figure 3:
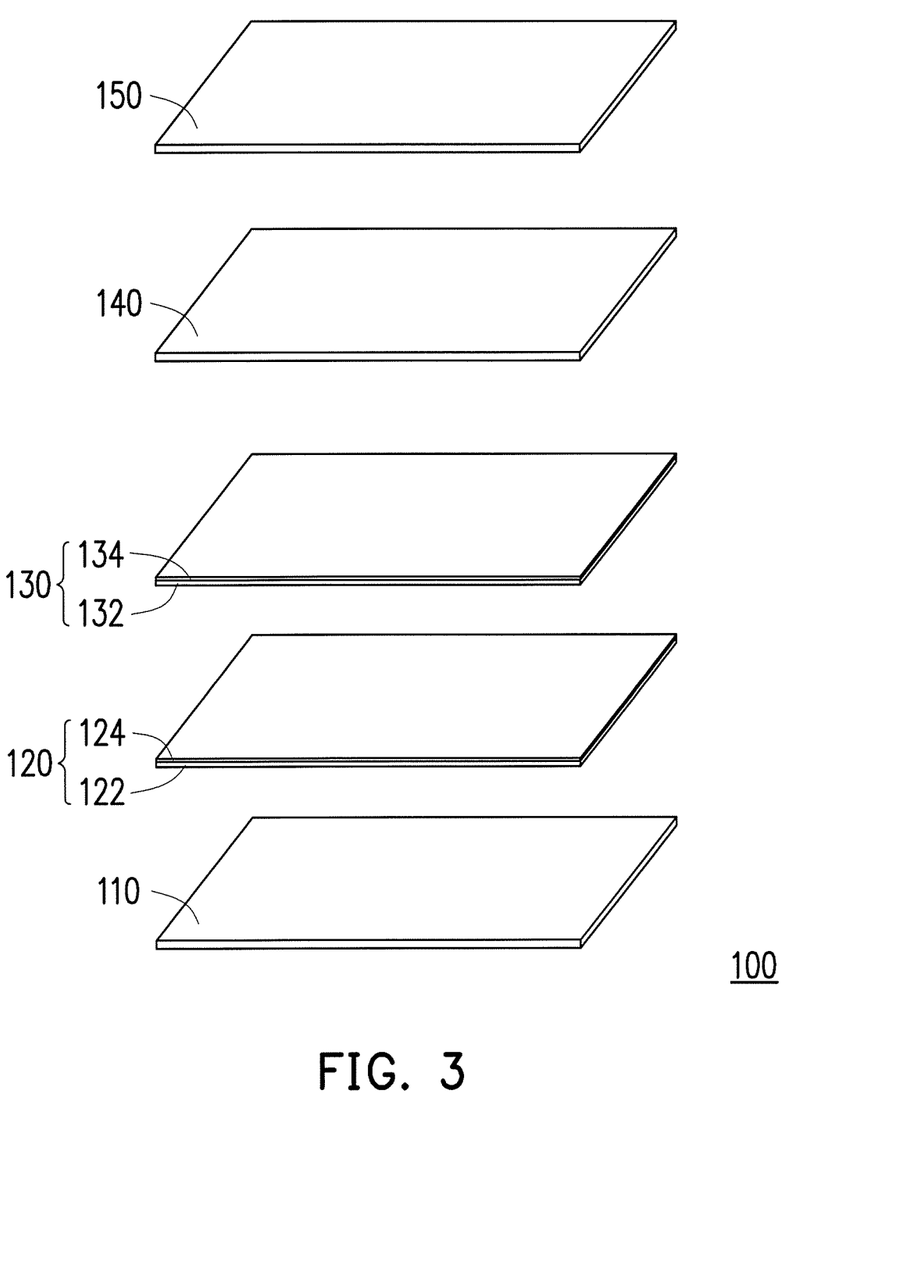
FIG. 3 is an exploded view of the touch projection screen of FIG. 2.

Referring to FIGS. 2 and 3, in this embodiment, the touch projection screen 100 includes a first substrate 110, a first touch layer 120, a second touch layer 130, a second substrate 140, and a reflective projection film 150. The first touch layer 120 is disposed on the first substrate 110. The first touch layer 120 includes a first base layer 122 and a first electrode pattern 124. The first electrode pattern 124 is disposed on the first base layer 122. The second touch layer 130 is disposed on the first touch layer 120. The second touch layer 130 includes a second base layer 132 and a second electrode pattern 134. The second electrode pattern 134 is disposed on the second base layer 132. The second substrate 140 is disposed on the second touch layer 130. In addition, the first touch layer 120 is disposed between the second touch layer 130 and the first substrate 110, and the second touch layer 130 is disposed between the second substrate 140 and the first touch layer 120. The reflective projection film 150 is disposed on the second substrate 140, such that the second substrate 140 is disposed between the second touch layer 130 and the reflective projection film 150. The reflective projection film 150 may receive the image light beam 52a of FIG. 1 and provide the image light beam 52a for the user's viewing.

In this embodiment, the first substrate 110, the first base layer 122, the second base layer 132, the second substrate 140, and the white reflective projection film 150 may be bonded by using an adhesive. An area of the first touch layer 120 is equal to an area of the second touch layer 130, for example. The first substrate 110, the first base layer 122, the second base layer 132, the second substrate 140, and the white reflective projection film 150 may be formed of polyethylene terephthalate (PET), for example. However, the invention is not limited thereto. The first electrode pattern 124 and the second electrode pattern 134 is formed by printing with a conductive slurry, for example. The conductive slurry may include metal such as gold, silver, copper, aluminum, etc., (e.g., silver slurry), or other conductive materials. However, the invention is not limited to the aforesaid materials. In this embodiment, the silver slurry may be coated on the first base layer 122 and the second base layer 132 through screen printing or roller printing, so as to respectively form the first electrode pattern 124 and the second electrode pattern 134. However, the invention is not limited thereto. Since the touch projection screen 100 is not required to be light transmissive, the first electrode pattern 124 and the second electrode pattern 134 may be formed of opaque materials.

In this embodiment, the first substrate 110, the first touch layer 120, the second touch layer 130, the second substrate 140, and the reflective projection film 150 are flexible. Thus, the touch projection screen 100 as a whole is a flexible structure, so as to be suitable for being wrapped up. The first touch layer 120 and the second touch layer 130 may be stably disposed between the first substrate 110 and the second substrate 140, so as to prevent the first touch layer 120 and the second touch layer from being unexpectedly deformed or moved when being wrapped up. The second substrate 140 is provided to reinforce a mechanical strength of the projection screen 100. However, in another embodiment, a thicker reflective projection film 150 may be adopted to functionally substitute the second substrate 140, so as to omit the second substrate 140. The reflective projection film 150 may be directly disposed on the second touch layer 130 and reduce a thickness of the touch projection screen 100.

Figure 4:
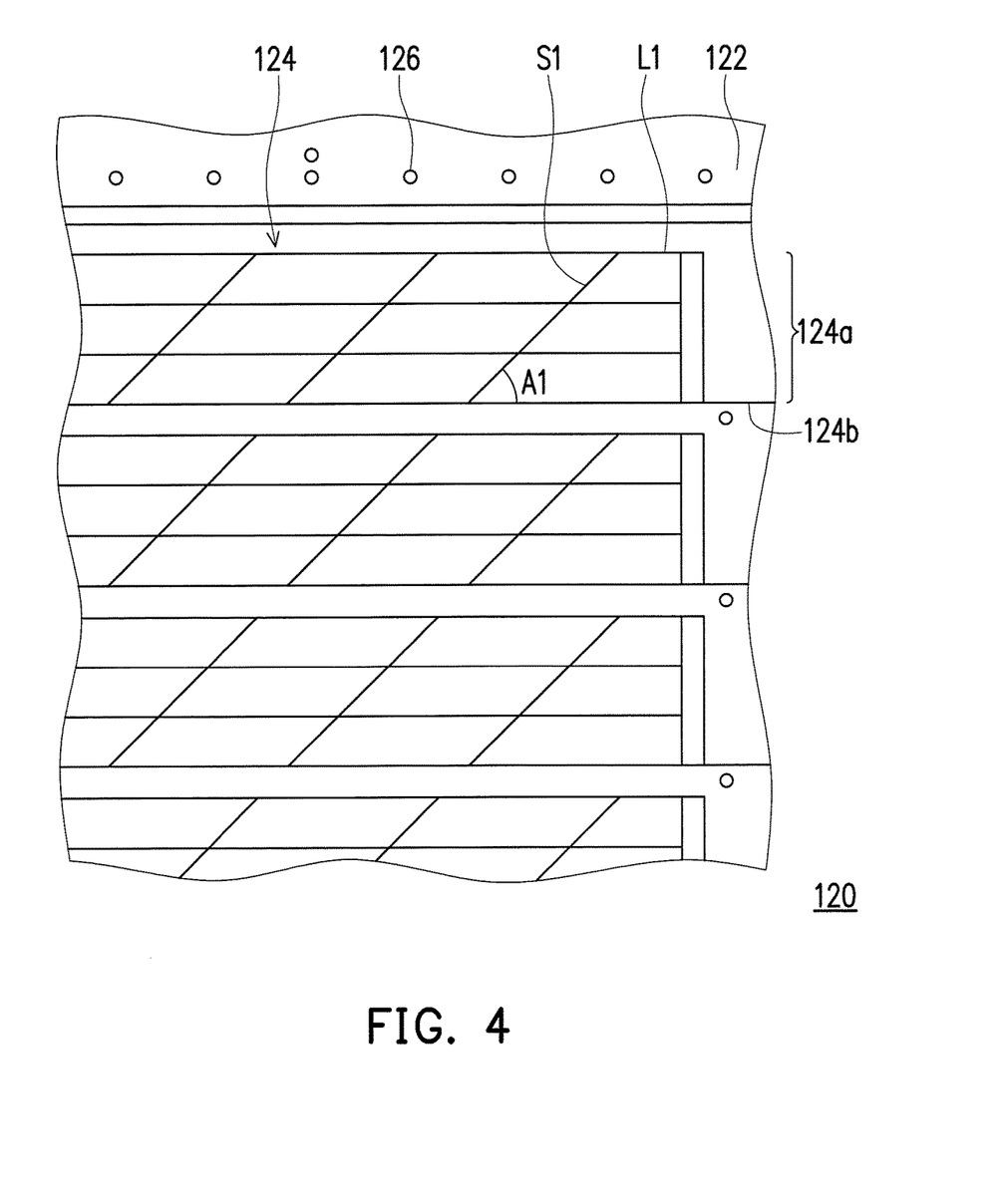
FIG. 4 is a partial top view illustrating the first touch layer of FIG. 2.

Referring to FIGS. 1 and 4, in this embodiment, the first electrode pattern 124 includes a plurality of first electrode line sets 124a. Each of the first electrode line sets 124a includes a plurality of first electrode lines L1 and a plurality of first electrode segments S1. The first electrode lines L1 are arranged to be parallel to each other. An included angle A1 between each of the first electrode segments S1 and one of the first electrode lines L1 is an acute angle, and two ends of each of the first electrode segments S1 are respectively connected to the corresponding first electrode lines L1. When a portion of one of the first electrode lines L1 in the same first electrode line set 124a is disconnected due to an error in the manufacturing process or insufficient conductive slurry, a touch signal may be directed from the disconnected first electrode line L1 to a normal and not disconnected first electrode line L1 through the first electrode segments S1, so as to ensure that other sections of the disconnected first electrode line L1 near the disconnected portion are still able to normally transmit the touch signal through the first electrode segment S1.

In this embodiment, the first electrode segments S1 are parallel to each other, for example. Two ends of each of the first electrode segments S1 are connected between two first electrode lines L1 in the corresponding first electrode line set 124a and cross other first electrode lines L1 in a corresponding second electrode line set 134a. The first electrode segments S1 are all line segments, and at least two of the first electrode segments S1 have the same length. The first electrode pattern 124 further includes a plurality of first collecting lines 124b. In addition, the first electrode lines L1 of each of the first electrode line sets 124a are collected to the corresponding first collecting line 124b, such that the first electrode line sets 124a are respectively electrically connected to a control unit (not shown, the control unit may be a control unit of the touch projection screen 100, for example) through the first collecting lines 124b.

Figure 5:
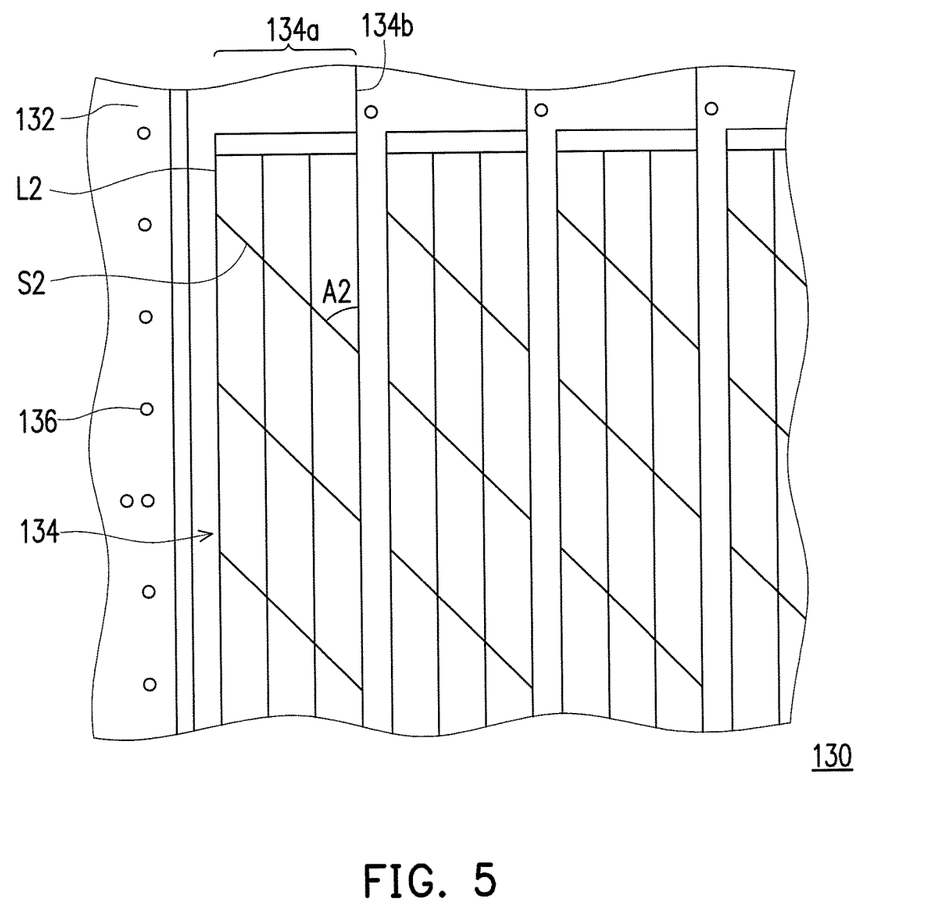
FIG. 5 is a partial top view illustrating the second touch layer of FIG. 2.

Referring to FIGS. 1 and 5, in this embodiment, the second electrode pattern 134 includes a plurality of the second electrode line sets 134a. Each of the second electrode line sets 134a includes a plurality of second electrode lines L2 and a plurality of second electrode segments S2. The second electrode lines L2 are arranged to be parallel to each other. An included angle A2 between each of the second electrode segments S2 and one of the second electrode lines L2 is an acute angle, and two ends of each of the second electrode segments S2 are respectively connected to the corresponding second electrode lines L2. When a portion of one of the second electrode lines L2 of the same second electrode line set 134a is disconnected due to an error in the manufacturing process or insufficient silver slurry, a touch signal may be directed from the disconnected second electrode line L2 to a normal and not disconnected second electrode line L2 through the second electrode segments S2, so as to ensure that other sections of the disconnected second electrode line L2 near the disconnected portion are still able to normally transmit the touch signal through the second electrode segment S2.

In this embodiment, the second electrode segments S2 are parallel to each other, for example. Two ends of each of the second electrode segments S2 are connected between two second electrode lines L2 in the corresponding second electrode line set 134a and cross other second electrode lines L2 in the corresponding second electrode line set 134a. The second electrode segments S2 are all line segments, and at least two of the second electrode segments S2 have the same length. The second electrode pattern 134 further includes a plurality of second collecting lines 134b. In addition, the second electrode lines L2 of each of the second electrode line sets 134a are collected to the corresponding second collecting line 134b, such that the second electrode line sets 134a are respectively electrically connected to a control unit (not shown, the control unit may be the control unit of the touch projection screen 100, for example) through the second collecting lines 124b.

Referring to FIGS. 4 and 5, a plurality of first alignment points 126 are provided on the first base layer 122, and a plurality of second alignment points 136 are provided on the second base layer 132 as well. Thus, when the first touch layer 120 of FIG. 2 is overlapped with the second touch layer 130, the second touch layer 130 may be accurately disposed onto the first touch layer 120 by respectively aligning the first alignment points 126 to the second alignment points 136. The first alignment points 126 and the second alignment points 136 may be formed by coating a material on the first base layer 122 and the second base layer 132 through screen printing or roller printing. However, the invention is not limited thereto.

Figure 6:
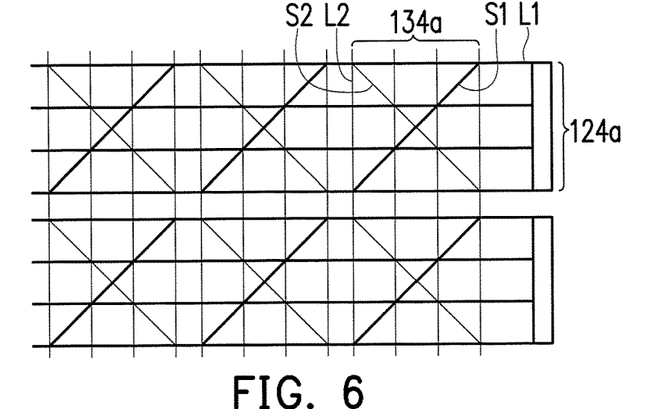
FIG. 6 is a top view where a portion of the first electrode line set of FIG. 4 and a portion of the second electrode line set of FIG. 5 are overlapped with respect to each other.

Referring to FIGS. 2 and 6, FIG. 6 is a top view where a portion of the first electrode line set of FIG. 4 and a portion of the second electrode line set of FIG. 5 are overlapped with respect to each other. To distinguish between the first electrode line set 124a and the second electrode line set 134a, the first electrode line set 124a is illustrated with lines having a thicker line width, while the second electrode line set 134a is illustrated with lines having a thinner line width. Also, FIG. 6 merely schematically illustrates an area where the first electrode line set 124a and the second electrode line set 134a are overlapped with respect to each other, and the first base layer 122 and the second base layer 132 are omitted. In this embodiment, orthogonal projections of the first electrode lines L1 and the second electrode lines L2 on the reflective projection film 150 (not shown in FIG. 6) are perpendicular to each other. Orthogonal projections of the first electrode segments S1 and the second electrode segments S2 on the reflective projection film 150 are also perpendicular to each other. It should be noted that in FIG. 6, the orthogonal projection of each of the first electrode segments S1 on the reflective projection film 150 and the orthogonal projection of each of the second electrode segments S2 on the reflective projection film 150 are in a mirror symmetry, for example, so as to improve a sensitivity to a touch signal generated when the user performs a touch operation. However, the invention is not limited thereto.

Figure 7:
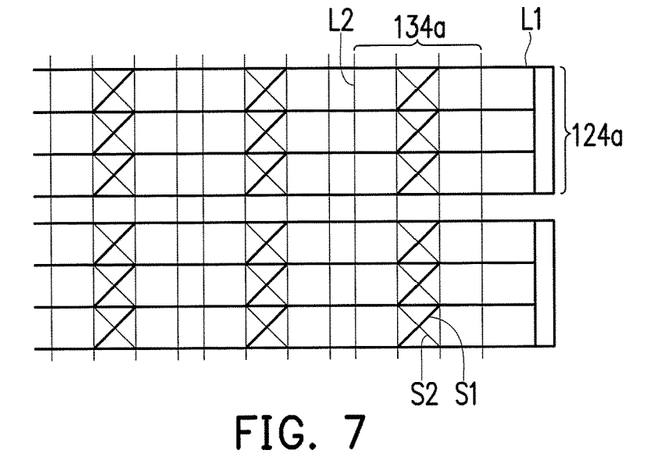
FIG. 7 is a top view where a portion of a first electrode line set and a portion of a second electrode line set according to another embodiment of the invention are overlapped with respect to each other.

In the embodiment of FIG. 6, the two ends of each of the first electrode segments S1 are connected between two first electrode lines L1 in the corresponding first electrode line set 124a and cross other first electrode lines L1 in the corresponding second electrode line set 134a. The two ends of each of the second electrode segments S2 are connected between two second electrode lines L2 in the corresponding second electrode line set 134a and cross other second electrode lines L2 in the corresponding second electrode line set 134a. Referring to FIG. 7, FIG. 7 is a top view where a portion of a first electrode line set and a portion of a second electrode line set according to another embodiment of the invention are overlapped with respect to each other. The embodiment of FIG. 7 and the embodiment of FIG. 6 are similar. Thus, like components are represented by like symbols, and the repeated descriptions are not reiterated in the following. A difference between the embodiment of FIG. 7 and the embodiment of FIG. 6 lies in that, the two ends of each of the first electrode segments S1 in the embodiment of FIG. 7 are connected between two adjacent first electrode lines L1 in the corresponding first electrode line set 124a, but do not cross other first electrode lines L1 of the corresponding first electrode line set 124a. The two ends of each of the second electrode segments S2 are connected between two adjacent second electrode lines L2 in the corresponding second electrode line set 134a, but do not cross other second electrode lines L2 in the corresponding second electrode line set 134a. It should be noted that, in this embodiment, the first electrode segments S1 are arranged in a direction parallel to a direction that the first electrode lines L1 are arranged, and the second electrode segments S2 are arranged in a direction perpendicular to a direction that the second electrode lines L2 are arranged. The orthogonal projection of each of the first electrode segments S1 on the reflective projection film 150 and the orthogonal projection of each of the second electrode segments S2 on the reflective projection film 150 are perpendicular to each other and in a mirror symmetry (i.e., showing a plurality of "X"), so as to improve the sensitivity to a touch signal generated when the user performs a touch operation. In addition, the direction that the second electrode segments S2 are arranged may also be parallel to the direction that the second electrode lines L2 are arranged. In addition, the orthogonal projection of each of the first electrode segment S1 on the reflective projection film 150 may not intersect or may not be perpendicular to the orthogonal projection of each of the second electrode segments S2 on the reflective projection film 150. The invention does not intend to impose a limitation in this regard.

Figure 8:
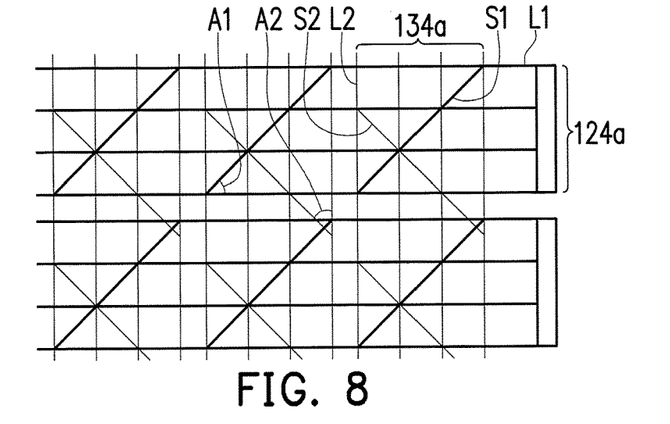
FIG. 8 is a top view where a portion of a first electrode line set and a portion of a second electrode line set according to another embodiment of the invention are overlapped with respect to each other.

Referring to FIG. 8, FIG. 8 is a top view where a portion of a first electrode line set and a portion of a second electrode line set according to another embodiment of the invention are overlapped with respect to each other. In addition, FIG. 8 merely schematically illustrate the area where the first electrode line set 124a and the second electrode line set 134a are overlapped with respect to each other, and the first base layer 122 and the second base layer 132 are omitted. The embodiment of FIG. 8 and the embodiment of FIG. 6 are similar. Thus, like components are represented by like symbols, and the repeated descriptions are not reiterated in the following. When the second touch layer 130 is stacked on the first touch layer 120 in the manufacturing process of the touch projection screen 100, the first electrode segments S1 and the corresponding second electrode segments S2 may be deviated from each other due to a man-made error or a machine printing error. For example, as shown in FIG. 8, the orthogonal projections of the first electrode segments S1 on the reflective projection film 150 and the orthogonal projections of the second electrode segments S2 on the reflective projection film 150 are not perpendicular to each other, and the orthogonal projections of the first electrode segments S1 on the reflective projection film 150 and the orthogonal projections of the second electrode segments S2 on the reflective projection film 150 are not in a mirror symmetry, either. Comparing the touch projection screen 100 with the conventional capacitive touch panel, the conventional capacitive touch panel needs to take the light transmittance and the accuracy in touch sensing into consideration. An electrode circuit on a touch layer of the conventional capacitive touch panel needs to be designed at a high precision level and aligned with respect to each other. However, in the touch projection screen 100 of this embodiment, since the reflective projection film 150 is an opaque white film (as shown in FIGS. 2 and 3), the orthogonal projection of each of the first electrode segments S1 on the reflective projection film 150 may not be overlapped with the orthogonal projection of each of the second electrode segments S2 on the reflective projection film 150, and the included angle A1 between the first electrode segment S1 and the first electrode line L1 and the included angle A2 between the second electrode segment S2 and the second electrode line L2 may not be equal to each other. With such design, the touch projection screen 100 is still able to maintain a preferable touch sensing accuracy.

In view of the foregoing, the embodiments of the invention at least exhibit one of the following advantages or effects. The plurality of electrode lines of the same electrode line set is connected by using the plurality of electrode segments. When any of the electrode lines is disconnected, the touch signal may be directed from the disconnected electrode line to the normal and not disconnected electrode line through the electrode segments, so as to ensure that other sections of the disconnected electrode line near the disconnected portion are still able to normally transmit the touch signal through the electrode segments.

Since the electrode lines have a narrow line width, the electrode lines may be easily disconnected due to an error in the manufacturing process or insufficient conductive slurry. Similarly, as the electrode lines have a narrow line width, the disconnected portion of the electrode lines may not be detectable through inspection with the naked eyes. Therefore, even though adding the electrode segments may increase the cost of materials, these electrode segments also reduce a touch area influenced by the disconnected portion of the electrode lines. Thus, an inspection at a high accuracy level and a corresponding fixing operation are no longer required. Consequently, the overall manufacturing cost may be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art after reading the disclosure. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch projection screen, used to receive an image light beam, comprising:
    a first substrate;
    a first touch layer, disposed on the first substrate, wherein the first touch layer comprises a first base layer and a first electrode pattern, the first electrode pattern is disposed on the first base layer, the first electrode pattern comprises a plurality of first electrode line sets, each of the first electrode line sets comprises a plurality of first electrode lines and a plurality of first electrode segments, the first electrode lines are arranged to be parallel to each other, an included angle between each of the first electrode segments and one of the first electrode lines is an acute angle, and two ends of each of the first electrode segments are connected to the corresponding first electrode lines;
    a second touch layer, disposed on the first touch layer, wherein the second touch layer comprises a second base layer and a second electrode pattern, the second electrode pattern is disposed on the second base layer, the second electrode pattern comprises a plurality of second electrode line sets, each of the second electrode line sets comprises a plurality of second electrode lines and a plurality of second electrode segments, the second electrode lines are arranged to be parallel to each other, an included angle between each of the second electrode segments and one of the second electrode lines is an acute angle, and two ends of each of the second electrode segments are connected to the corresponding second electrode lines; and
    a reflective projection film, disposed on the second touch layer to receive and reflect the image light beam,
    wherein all the first electrode segments of each of the first electrode line sets have a same length and are arranged to be parallel to each other, all the second electrode segments of each of the second electrode line sets have a same length and are arranged to be parallel to each other, and orthogonal projections of the first electrode segments on the reflective projection film and orthogonal projections of the second electrode segments on the reflective projection film are perpendicular to each other.

2. The touch projection screen as claimed in claim 1, wherein the two ends of each of the first electrode segments are connected between two first electrode lines in the corresponding first electrode line set, and the two ends of each of the second electrode segments are connected between two second electrode lines in the corresponding second electrode line set.

3. The touch projection screen as claimed in claim 1, wherein the first electrode segments and the second electrode segments are line segments.

4. The touch projection screen as claimed in claim 1, wherein at least two of the first electrode segments have the same length, and at least two of the second electrode segments have the same length.

5. The touch projection screen as claimed in claim 1, further comprising:
    a second substrate, disposed between the second touch layer and the reflective projection film.

6. The touch projection screen as claimed in claim 1, wherein the touch projection screen is flexible.

7. The touch projection screen as claimed in claim 1, wherein the first electrode pattern further comprises a plurality of first collecting lines, and the first electrode lines of each of the first electrode line sets are collected to the corresponding first collecting line, such that the first electrode line sets are respectively electrically connected to a control unit through the first collecting lines.

8. The touch projection screen as claimed in claim 1, wherein the second electrode pattern further comprises a plurality of second collecting lines, and the second electrode lines of each of the second electrode line sets are collected to the corresponding second collecting line, such that the second electrode line sets are respectively electrically connected to a control unit through the second collecting lines.

9. The touch projection screen as claimed in claim 1, wherein orthogonal projections of the first electrode lines on the reflective projection film and orthogonal projections of the second electrode lines on the reflective projection film are perpendicular to each other.

10. The touch projection screen as claimed in claim 1, wherein an area of the first touch layer is equal to an area of the second touch layer.

11. The touch projection screen as claimed in claim 1, wherein a plurality of first alignment points are provided on the first base layer, a plurality of second alignment points are provided on the second base layer, and the second alignment points are respectively aligned to the first alignment points.

12. A projection system, comprising:
    the touch projection screen as claimed in claim 1; and
    a projection device, projecting the image light beam onto the touch projection screen.

* * * * *